US012114588B2

(12) United States Patent
Qin et al.

(10) Patent No.: US 12,114,588 B2
(45) Date of Patent: Oct. 15, 2024

(54) OPERATION MONITORING SYSTEM AND MONITORING METHOD

(71) Applicant: FJ Dynamics Technology Academy (Chang zhou) Co., Ltd, Changzhou (CN)

(72) Inventors: Shuo Qin, Changzhou (CN); Jia-yuan Qi, Changzhou (CN); Bing Xu, Changzhou (CN); Yi-Chao Wu, Changzhou (CN)

(73) Assignee: FJ Dynamics Technology Academy (Chang zhou) Co., Ltd, Changzhou (CN)

(*) Notice: Subject to any disclaimer, the term of this patent is extended or adjusted under 35 U.S.C. 154(b) by 683 days.

(21) Appl. No.: 17/374,030

(22) Filed: Jul. 13, 2021

(65) Prior Publication Data

US 2021/0360846 A1   Nov. 25, 2021

Related U.S. Application Data

(63) Continuation-in-part of application No. PCT/CN2019/106298, filed on Sep. 18, 2019.

(30) Foreign Application Priority Data

Jan. 18, 2019  (CN) .......................... 201910048403.6
Mar. 13, 2019  (CN) .......................... 201910187499.4

(51) Int. Cl.
*A01B 79/00*  (2006.01)
*G05B 19/406*  (2006.01)

(52) U.S. Cl.
CPC .......... *A01B 79/005* (2013.01); *G05B 19/406* (2013.01); *G05B 2219/45017* (2013.01)

(58) Field of Classification Search
CPC ........ A01B 79/005; G05B 2219/45017; G05B 2219/24024; G05B 2219/2663;
(Continued)

(56) References Cited

U.S. PATENT DOCUMENTS

2004/0074677 A1   4/2004  Goff
2011/0015816 A1   1/2011  Dow et al.
(Continued)

FOREIGN PATENT DOCUMENTS

CN    105700533 A    6/2016
CN    106406189 A    2/2017
(Continued)

*Primary Examiner* — Russell Frejd
(74) *Attorney, Agent, or Firm* — ScienBiziP, P.C.

(57) ABSTRACT

An operation monitoring system and monitoring method are provided, the operation monitoring system is used for monitoring at least one agricultural machine, so as to control an operating range of the agricultural machine, the operation monitoring system includes a storage device and a processor, the processor recognizes at least one operating area and at least one non-operating area of an operation environment, and generates at least one boundary between the operating area and the non-operating area, the processor further generates least one electronic fence at the at least one boundary, the processor further acquires the position of the electronic fence and monitors a position of the agricultural machine, so as to monitor whether the agricultural machine is operating in the operating area on a side of the electronic fence, thereby controlling the operating range of the agricultural machine.

19 Claims, 6 Drawing Sheets

(58) Field of Classification Search
CPC .............. G05B 19/406; G05B 19/0428; G05B 19/0426; G05B 19/048
See application file for complete search history.

(56) References Cited

U.S. PATENT DOCUMENTS

| | | |
|---|---|---|
| 2011/0166788 A1 | 7/2011 | Griffin |
| 2014/0292567 A1* | 10/2014 | Feldhaus ................ G01S 19/07 342/357.4 |
| 2016/0147962 A1 | 5/2016 | Vollmar et al. |
| 2018/0027145 A1 | 1/2018 | Kurzhanskiy et al. |
| 2018/0325015 A1* | 11/2018 | Wolters ................ B60W 10/20 |
| 2019/0248326 A1* | 8/2019 | McIntosh ............. G05D 1/0022 |
| 2020/0029171 A1* | 1/2020 | Pegg ..................... H04W 4/021 |
| 2020/0168101 A1* | 5/2020 | Huang ................... H04L 67/52 |

FOREIGN PATENT DOCUMENTS

| | | |
|---|---|---|
| CN | 107295083 | 10/2017 |
| CN | 107703945 A | 2/2018 |
| JP | 2018164420 | 10/2018 |
| WO | 2018006216 | 1/2018 |

\* cited by examiner

OPERATION MONITORING SYSTEM AND MONITORING METHOD

TECHNICAL FIELD

The present disclosure relates to a field of agricultural machinery, and particularly to an operation monitoring system and a monitoring method.

BACKGROUND

With a development of agricultural technology, agricultural machines are frequently used, and an automation rate is gradually increasing. Move operations are often required while the agricultural machines are operating, however, operation safety of the agricultural machines may be threatened by unsafe factors in an operation environment. Farmlands located near mountain areas, water systems, roads, or other places, may cause different problems due to the different environments. For example, the farmlands in mountain areas are usually near mountain walls, cliffs, etc., once the agricultural machines approach the mountain walls, the cliffs, etc., while operation, there are risks of collision with the mountain walls and/or falling off the cliffs. Agricultural machines which operate near water systems may also have the risk of falling into the water.

Operation range is a very important factor while the agricultural machines are in operation. Any action that is out of the operation ranges may cause risk.

SUMMARY

The present disclosure provides an operation monitoring system and a monitoring method thereof. The operation monitoring system monitors operation environment of an agricultural machine, and controls the agricultural machine to only operate in an operating area.

The present disclosure further provides an operation monitoring system and a monitoring method thereof. The operation monitoring system generates an electronic fence around the operating area, to limit the operating area, thereby controlling the agricultural machine to only operate in the operating area.

The present disclosure further provides an operation monitoring system and a monitoring method thereof. The operation monitoring system monitors whether the agricultural machine is in the operating area by determining whether the electronic fence is triggered. For example, after the operation monitoring system determines that the agricultural machine goes beyond the operating area through the electronic fence, the agricultural machine can be shut down, to ensure safety.

The present disclosure further provides an operation monitoring system and a monitoring method thereof. The operation monitoring system acquires data of the operation environment through a monitoring device, recognizes the operating area and the non-operating area, thereby generating the electronic fence at the boundary of the operating area and the non-operating area.

The present disclosure further provides an operation monitoring system and a monitoring method thereof. The operation monitoring system demarcates the boundary between the operating area and the non-operating area, and generates the electronic fence at the boundary of the operating area and the non-operating area to separate the operating area and the non-operating area.

The present disclosure further provides an operation monitoring system and a monitoring method thereof. The operation monitoring system formulates a safety strategy, when the agricultural machine triggers the electronic fence, the safety strategy is invoked to instruct the agricultural machine to execute, so as to prevent safety risks. For example, when the agricultural machine triggers the electronic fence, the safety strategy is invoked to instruct the agricultural machine to execute, thereby enabling the agricultural machine to be in a shutdown state, so as to prevent the safety risks.

The present disclosure further provides an operation monitoring system and a monitoring method thereof. The operation monitoring system formulates a corresponding safety strategy according to surrounding environment of the electronic fence, to effectively prevent the safety risks in different environments.

The present disclosure further provides an operation monitoring system and a monitoring method thereof. The operation monitoring system pre-recognizes the operating area and the non-operating area and pre-generates a boundary, and pre-generates the electronic fence at the boundary prior to the at least one agricultural machine is operating, when the agricultural machine is operating in the operating area, according to the pre-generated electronic fence, controls the agricultural machine to only operate in the operating area, to prevent the safety risks when the electronic fence has been triggered in time.

The present disclosure further provides an operation monitoring system and a monitoring method thereof. The operation monitoring system monitors the operation environment around the agricultural machine in real time, and recognizes the operating area and the non-operating area in real time, generates the boundary in real time, and generates the electronic fence at the boundary in real time, when the agricultural machine is operating in the operating area, according to the real-time electronic fence, controls the agricultural machine to operate in the operating area in real time, so as to prevent the safety risks.

Other features of the present disclosure are fully embodied by the following detailed description and can be implemented by the combination of means and devices specifically pointed out in the appended claims.

According to one aspect of the present disclosure, an operation monitoring system of the present disclosure is configured to monitor at least one agricultural machine, and includes: an environment analysis module, the environment analysis module recognizes at least one operating area and at least one non-operating area of an operation environment, generates at least one boundary between the at least one operating area and the at least one non-operating area; a boundary control module, the boundary control module communicates with the environment analysis module and generate at least one electronic fence at the at least one boundary; and at least one monitoring module, the monitoring module communicates with the boundary control module and acquires the position of the electronic fence, the monitoring module monitors a position of the agricultural machine, and monitors whether the agricultural machine is operating in the operating area on a side of the electronic fence.

According to one embodiment of the present disclosure, the environment analysis module includes an environment data acquiring module, the environment data acquiring module communicates with at least one monitoring device, the at least one monitoring device monitors the operation environment, generates environment data, and transmits the environment data to the environment data acquiring module.

According to one embodiment of the present disclosure, the environment analysis module further includes: an operating area recognition module, the operating area recognition module acquires the environment data from the environment data acquiring module, the operating area recognition module recognizes the operating area of the operation environment; a non-operating area recognition module, the non-operating area recognition module acquires the environment data from the environment data acquiring module, the non-operating area recognition module recognizes the non-operating area of the operation environment; and a boundary generating module, the boundary generating module acquires the position of the operating area from the operating area recognition module, acquires the position of the non-operating area from the non-operating area recognition module, respectively, the boundary generating module generates the boundary between the operating area and the non-operating area.

According to one embodiment of the present disclosure, the boundary control module includes: an operating area demarcating module, the operating area demarcating module acquires positions of the operating area, the non-operating area, and the boundary from the environment analysis module, the operating area demarcating module demarcates the operating area where the agricultural machine is to operate; an electronic fence generating module, the electronic fence generating module generates the electronic fence at the boundary between the operating area where the agricultural machine is to operate and the non-operating area.

According to one embodiment of the present disclosure, the operation monitoring system further includes a decision-making module, the decision-making module acquires the position of the electronic fence and the non-operating area on the other side of the electronic fence from the boundary control module, the decision-making module formulates at least one safety strategy according to an environment condition of the electronic fence.

According to one embodiment of the present disclosure, the decision-making module includes a non-operating area analysis module, the non-operating area analysis module acquires the position of the non-operating area on the other side of the electronic fence from the boundary control module, the non-operating area analysis module analyzes environment features of the non-operating area.

According to one embodiment of the present disclosure, the decision-making module includes a safety strategy formulating module, the safety strategy formulating module acquires the environment features of the non-operating area from the non-operating area analysis module, the safety strategy formulating module formulates the safety strategy according to the environment features of the non-operating area on the side of the electronic fence.

According to one embodiment of the present disclosure, the monitoring module includes: a position monitoring module, the position monitoring module monitors the position of the agricultural machine; and a trigger determining module, the trigger determining module acquires the position of the electronic fence from the boundary control module, the trigger determining module acquires the position of the agricultural machine from the position monitoring module, the trigger determining module determines whether the agricultural machine triggers the electronic fence according to a position relationship between the agricultural machine and the electronic fence.

According to one embodiment of the present disclosure, the monitoring module further includes a feedback module, the feedback module communicates with the trigger determining module, when the trigger determining module determines that the agricultural machine triggers the electronic fence, the feedback module feeds back the position of the electronic fence where is triggered by the agricultural machine to the decision-making module.

According to one embodiment of the present disclosure, the decision-making module further includes an executing module, the executing module acquires the position of the electronic fence where is triggered by the agricultural machine from the feedback module, the executing module invokes the safety strategy corresponding to the position of the electronic fence where is triggered by the agricultural machine from the safety strategy formulating module, which is executed by the agricultural machine.

According to one embodiment of the present disclosure, the monitoring device pre-monitors the operation environment prior to the at least one agricultural machine is operating, the environment analysis module pre-acquires the pre-monitored environment data from the monitoring device prior to the at least one agricultural machine is operating, pre-recognizes the operating area and the non-operating area prior to the at least one agricultural machine is operating, and generates the at least one boundary prior to the at least one agricultural machine is operating.

According to one embodiment of the present disclosure, the monitoring device monitors the operation environment in real time, the environment analysis module acquires the environment data from the monitoring device in real time, recognizes the operating area and the non-operating area in real time, and generates the at least one boundary in real time.

According to one embodiment of the present disclosure, the monitoring device is implemented as an unmanned aerial vehicle, a base station, a satellite, or a combination thereof.

According to one embodiment of the present disclosure, the monitoring device is implemented as a camera device, a monitoring facility, or a combination thereof.

According to another aspect of the present disclosure, the present disclosure further provides an operation monitoring method, to monitor an agricultural machine, includes the following steps: (A) generating at least one electronic fence at a boundary between an operating area and a non-operating area; (B) determining whether the agricultural machine triggers the electronic fence; and (C) controlling an operating state of the agricultural machine according to a determining result.

According to one embodiment of the present disclosure, before the step (A), the operation monitoring method further includes the step: (D) determining the boundary between the operating area and the non-operating area.

According to one embodiment of the present disclosure, before the step (D), the operation monitoring method further includes the steps: acquiring environment data by monitoring an operation environment through at least one monitoring device; recognizing the operating area and the non-operating area of the operation environment according to the environment data of the operation environment, and determining the boundary between the operating area and the non-operating area.

According to one embodiment of the present disclosure, between the step (A) and the step (B), the operation monitoring method further includes the steps: analyzing environment features of the non-operating area on other side of the electronic fence; and formulating a safety strategy according to the environment features of the non-operating area.

According to one embodiment of the present disclosure, between the step (A) and the step (B), the operation monitoring method further includes the step: acquiring a position of the agricultural machine; and analyzing a position relationship between the agricultural machine and the electronic fence.

Through the understanding of the following description and the drawings, the further objectives and advantages of the present disclosure will be fully embodied.

These and other objectives, features, and advantages of the present disclosure are fully embodied by the following detailed description, drawings, and claims.

DETAILED DESCRIPTION

The following description is used to disclose the present disclosure so that one skilled in the art can implement the present disclosure. The preferred embodiments in the following description are only examples, and one skilled in the art can think of other obvious variations. The basic principles of the present disclosure defined in the following description can be applied to other embodiments, modified embodiments, improvement embodiments, equivalent embodiments, and other technical solutions that do not deviate from the spirit and scope of the present disclosure.

One skilled in the art should understand that, according to the present disclosure, the orientation or position relationship indicated by the terms "longitudinal", "lateral", "upper", "lower", "front", "rear", "left", "right", "vertical", "horizontal", "top", "bottom", "inner", "outer", etc., is the orientation or position relationship shown in the drawings, which is convenient for describing the present invention and simplifying the description, rather than indicating or implying that the referred device or component must have a specific orientation, be constructed and operated in a specific orientation, the above terms should not be understood as limiting the present disclosure.

It can be understood that, the term "a" should be understood as "at least one" or "one or more", that is, in one embodiment, the number of a component may be one, and in another embodiment, the number of the component may also be multiple, the term "one" cannot be understood as a restriction on the number.

Referring to FIGS. 1-5 of the accompanying drawings of the description of the present disclosure, an operation monitoring system 100 according to a preferred embodiment of the present disclosure is disclosed and expounded in the following description. The operation monitoring system 100 at least monitors an operating area 203 of an agricultural machine 201, and controls the agricultural machine 201 to operate within the limited operating area 203. Once the agricultural machine 201 goes out of the operating area 203, the operation monitoring system 100 controls the agricultural machine 201 to execute a safety strategy, thereby avoiding a safety risk caused by the agricultural machine 201 going out of the operating area 203. The operation monitoring system 100 can be a personal computer, a server, or other device consisting of multiple pieces of hardware.

Figure 1:
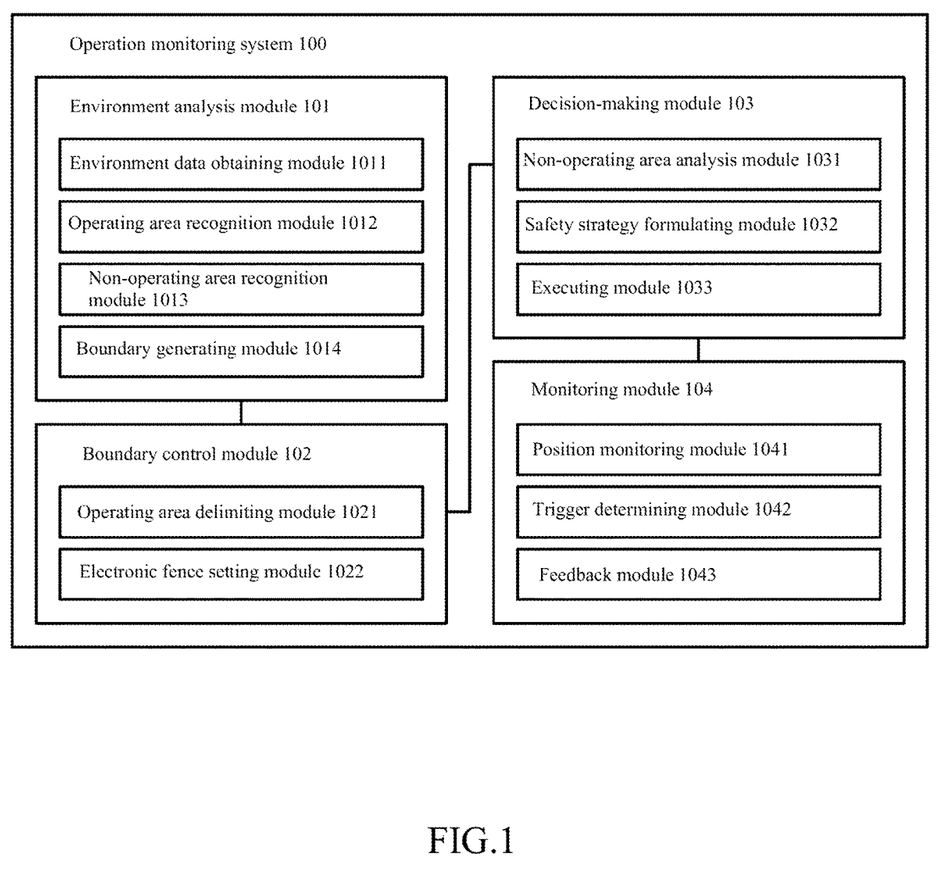
FIG. 1 is a block diagram of a preferred embodiment according to the present disclosure.
Figure 2:
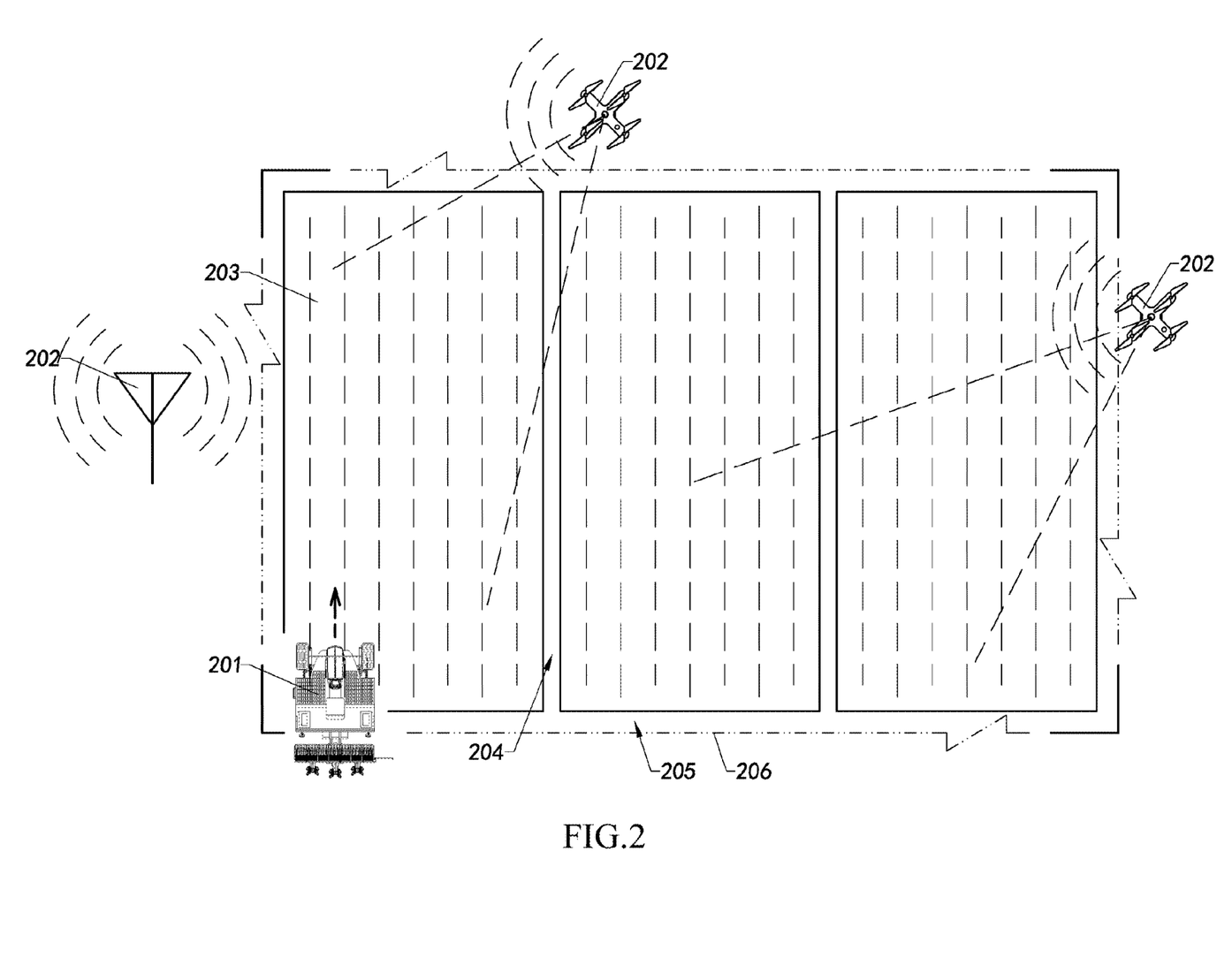
FIG. 2 is a schematic view of the above-mentioned embodiment according to the present disclosure.

Referring to FIG. 1 and FIG. 2, the operation monitoring system 100 includes an environment analysis module 101, the environment analysis module 101 analyzes the environment in which the agricultural machine 201 operates. The environmental analysis module 101 communicates with at least one monitoring device 202. The monitoring device 202 analyzes the operation environment of the agricultural machine 201, and acquires data of the operation environment of the agricultural machine 201. The environment analysis module 101 recognizes at least one operating area 203 and at least one non-operating area 204 in the environment. The environment analysis module 101 further demarcates a boundary 205 between the recognized operating area 203 and non-operating area 204. Preferably, while the agricultural machine 201 is operating in the operating area 203, and the operation monitoring system 100 monitors whether the agricultural machine 201 is in the operating area 203, if the agricultural machine 201 goes beyond the boundary 205, goes out from the operating area 203 to the non-operating area 204, the operation monitoring system 100 requires to instruct the agricultural machine 201 to execute a safety strategy.

The operation monitoring system 100 further includes a boundary control module 102. The boundary control module 102 acquires the positions of the operating area 203, the non-operating area 204, and the boundary 205 of the operation environment of the agricultural machine 201 from the environment analysis module 101. The boundary control module 102 recognizes the operating area 203 for the agricultural machine 201 to operate, and generates an electronic fence 206 for the boundary 205 of the operating area 203 and the non-operating area 204. The boundary control module 102 generates the electronic fence 206 of the boundary 205 of the operating area 203 to control the agricultural machine 201 to operate within a limited area, thereby preventing the safety risks.

It is worth mentioning that, the electronic fence 206 is a fence formed by control signals for distinguish the operating area 203 from the non-operating area 204, in the operating area 203 demarcated by the electronic fence 206, the agricultural machine 201 can receive the control signals to operate in the operating area 203, if the agricultural machine 201 goes beyond the electronic fence 206 and enters the non-operating area 204 from the operating area 203, the agricultural machine 201 cannot receive the control signals, and can but is not limited to be in a shutdown state, thereby preventing the potential safety risks.

The operation monitoring system 100 further includes a decision-making module 103, the decision-making module 103 communicates with the boundary control module 102, and acquires the position of the operating area 203 on a side of the electronic fence 206 and the non-operating area 204 on the other side of the electronic fence 206 from the boundary control module 102. The decision-making module 103 analyzes an environment condition of the non-operating area 204 and the safety risk of the agricultural machine 201 while entering the non-operating area 204 over the electronic fence 206. The decision-making module 103 further analyzes a safety strategy that can be executed by the agricultural machine 201 to avoid the safety risk according to the safety risk of the non-operating area 204.

The operation monitoring system 100 further includes a monitoring module 104, the monitoring module 104 communicates with the boundary control module 102, and acquires the positions of the electronic fence 206, the operating area 203 on the side of the electronic fence 206, and the non-operating area 204 on the other side. The monitoring module 104 determines whether the agricultural machine 201 triggers the electronic fence 206 according to a position relationship between the agricultural machine 201 and the electronic fence 206. The monitoring module 104 monitors a position of the agricultural machine 201 and determines whether the agricultural machine 201 is in the non-operating area 204. The monitoring module 104 analyzes whether the agricultural machine 201 triggers the electronic fence 206. When the monitoring module 104 monitors that the agricultural machine 201 triggers the electronic fence 206, the decision-making module 103 invokes the safety strategy suitable for the electronic fence 206 and transmits the safety strategy to the agricultural machine 201. The agricultural machine 201 executes the safety strategy.

The word "module" as used herein, refers to logic embodied in hardware or firmware, or to a collection of software instructions, written in a programming language, such as, for example, Java, C, or assembly. One or more software instructions in the function modules may be embedded in firmware. It will be appreciated that the function modules may include connected logic modules, such as gates and flip-flops, and may include programmable modules, such as programmable gate arrays or processors. The function module described herein may be implemented as either software and/or hardware modules and may be stored in a storage device.

Figure 3:
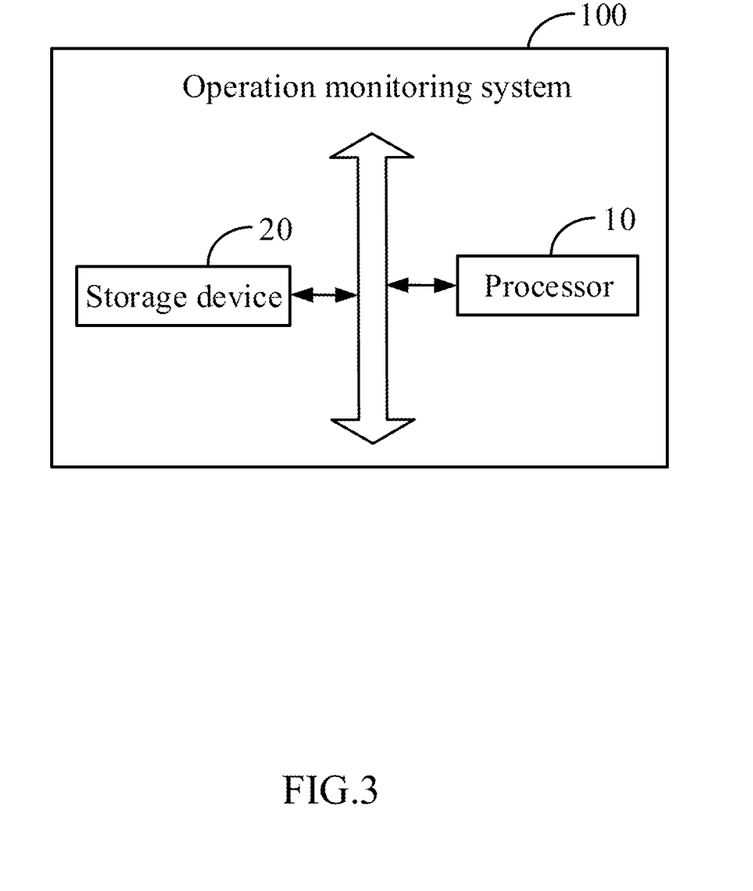
FIG. 3 is another block diagram of a preferred embodiment according to the present disclosure.

Referring to FIG. 3, in one embodiment, the operation monitoring system 100 further includes, a storage device 10 and at least one processor 20. The at least one processor 20 is used to execute a plurality of modules (e.g., the environment analysis module 101, the boundary control module 102, the decision-making module 103, the monitoring module 104, and the submodules of each of the modules 101-104 shown in FIG. 1) and other applications. The submodules include modules 1011-1014, modules 1021-1022, modules 1031-1033, and modules 1041-1043. The storage device 10 stores the computerized instructions of the plurality of modules, and one or more programs, such as the applications of the operation monitoring system 100. The storage device 10 can be any type of non-transitory computer-readable storage medium or other computer storage device, such as a hard disk drive, a compact disc, a digital video disc, a tape drive, a storage card (e.g., a memory stick, a smart media card, a compact flash card), or other suitable storage medium, for example. The at least one processor 20 can be a central processing unit (CPU), a microprocessor, or other data processor chip that performs functions in the operation monitoring system 100.

The decision-making module 103 formulates the safety strategy according to the environment condition on both sides of the electronic fence 206. When the decision-making module 103 analyzes that the environment condition of the non-operating area 204 on the other side of the electronic fence 206 at different locations around the operating area 203 are different, the decision-making module 103 formulates the corresponding safety strategy for the electronic fence 206 at each of the different locations, so as to adapt to different environment conditions of the non-operating area 204.

When the monitoring module 104 monitors that the agricultural machine 201 triggers the electronic fence 206, the monitoring module 104 further monitors a position of the electronic fence 206 where is triggered by the agricultural machine 201, so that the decision-making module 103 invokes the safety strategy of the electronic fence 206 corresponding to the position.

The environment analysis module 101 includes an environment data acquiring module 1011, the environment data acquiring module 1011 communicates with the monitoring device 202, the monitoring device 202 monitors the operation environment, and acquires the environment data by the environment data acquiring module 1011.

The monitoring device 202 may be implemented as an unmanned aerial vehicle. The unmanned aerial vehicle flies over the operation environment, and acquires images, infrared images etc. of the operation environment by a carried camera device, an infrared device, a sensor, etc., and transmits the images or infrared images to the environment data acquiring module 1011. The monitoring device 202 can also be implemented as a base station. The base station is arranged in the operation environment, such as in the farmland or near the farmland, acquires the data of the operation environment by detecting the operation environment, and transmits the environment data to the environment data acquiring module 1011.

The environment analysis module 101 further includes an operating area recognition module 1012, a non-operating area recognition module 1013, and a boundary generating module 1014. The operating area recognition module 1012 communicates with the environment data acquiring module 1011 and acquires the environment data. The operating area recognition module 1012 recognizes an area for the agricultural machine 201 to operate in the operation environment as the operating area 203. The non-operating area recognition module 1013 communicates with the environment data acquiring module 1011 and acquires the environment data. The non-operating area recognition module 1013 recognizes an area that is not for the agricultural machine 201 to operate in the operation environment as the non-operating area 204. For example, the non-operating area recognition module 1013 recognizes the areas such as roads, ridges, ponds, mountains, and rocks as the non-operating area 204. The boundary generating module 1014 acquires the positions of the operating area 203 and the non-operating area 204 from the operating area recognition module 1012 and the non-operating area recognition module 1013, respectively, the boundary generating module 1014 generates the boundary 205 between the operating area 203 and the non-operating area 204.

The boundary control module 102 further includes an operating area demarcating module 1021 and an electronic fence generating module 1022. The operating area demarcating module 1021 demarcates the operating area 203 where the agricultural machine 201 is to operate, and the electronic fence generating module 1022 generates the electronic fence 206 according to the operating area 203 demarcated by the operating area demarcating module 1021, the agricultural machine 201 is to operate in the operating area 203 surrounded by the electronic fence 206. Therein, the operating area demarcating module 1021 acquires the positions of the operating area 203, the non-operating area 204, and the boundary 206 from the environment analysis module 101. The operating area demarcating module 1021 demarcates the operating area 203 where the agricultural machine 201 is to operate, and the electronic fence generating module 1022 generates the electronic fence 206 at the boundary 205 between the operating area 203 and the non-operating area 204, according to the operating area 203 where the agricultural machine 201 is to operate demarcated by the operating area demarcating module 1021.

The decision-making module 103 includes a non-operating area analysis module 1031 and a safety strategy formulating module 1032. The non-operating area analysis module 1031 acquires the position of the non-operating area 204 on the side of the electronic fence 206 from the boundary control module 102. The non-operating area analysis module 1031 analyzes the environment condition of the non-operating area 204 and acquires environment features of the non-operating area 204. The non-operating area analysis module 1031 further analyzes the safety risks of the non-operating area 204 according to the environment features of the non-operating area 204. The safety strategy formulating module 1032 formulates the safety strategy according to the environment features of the non-operating area 204. The safety strategy formulating module 1032 further formulates the safety strategy according to the safety risks of the non-operating area 204.

According to the environment data acquired by the environment analysis module 101 and the non-operating area 206 on the side of the electronic fence 206 generated by the boundary control module 102, the non-operating area analysis module 1031 analyzes that the environment features of the non-operating area 206 on the side of the electronic fence 206 are not identical. The non-operating area analysis module 1031 further analyzes respective environment features according to different non-operating areas 204 on the side of the electronic fence 206 at different locations. The safety strategy formulating module 1032 formulates the corresponding safety strategy according to the different environment features of the non-operating area 206 on the side of the electronic fence 206 at different locations, so that the safety strategy can adapt to the different environment features.

The monitoring module 104 includes a position monitoring module 1041, the position monitoring module 1041 communicates with the monitoring device 202, the monitoring device 202 locates the agricultural machine 201, and monitors a real-time position of the agricultural machine 201. The monitoring module 104 further includes a trigger determining module 1042, the trigger determining module 1042 communicates with the boundary control module 102 and acquires the position of the electronic fence 206. The trigger determining module 1042 determines whether the real-time position of the agricultural machine 201 is located in the electronic fence 206 or goes beyond the electronic fence 206 to leave the operating area 203, according to the real-time position of the agricultural machine 201 monitored by the position monitoring module 1041. That is, the trigger determining module 1042 determines whether the agricultural machine 201 triggers the electronic fence 206 according to the position relationship between the agricultural machine 201 and the electronic fence 206. When the trigger determining module 1042 analyzes that the agricultural machine 201 is located in the electronic fence 206 or goes beyond the electronic fence 206 to leave the operating area 203, the trigger determining module 1042 determines that the electronic fence 206 is triggered.

The position monitoring module 1041 monitors the position of the agricultural machine 201 in real time, the trigger determining module 1042 further analyzes the position of the electronic fence 206 triggered by the agricultural machine 201. The monitoring module 104 further includes a feedback module 1043, the feedback module 1043 communicates with the trigger determining module 1042 and acquires the position of the electronic fence 206 where is triggered, the feedback module 1043 communicates with the decision-making module 103 and feeds back the position of the electronic fence 206 where is triggered to the decision-making module 103. The decision-making module 103 includes an executing module 1033. The executing module 1033 acquires the triggered position of the electronic fence 206 fed back by the feedback module 1043. The executing module 1033 invokes the safety strategy corresponding to the triggered position of the electronic fence 206 from the safety strategy formulating module 1032, and transmits the safety strategy to the agricultural machine 201, to instruct the agricultural machine 201 to execute the safety strategy.

In another example of the present disclosure, the monitoring device 202 is arranged on the agricultural machine 201. While the agricultural machine 201 is moving, the monitoring device 202 monitors the operation environment.

The monitoring device 202 monitors the operation environment, and as the agricultural machine 201 moves, acquires the environment data at different locations in real time. The environment analysis module 101 acquires the real-time environment data from the monitoring device 202 in real time, and analyzes the operation environment in real time. The environment data acquiring module 1011 acquires the real-time environment data from the monitoring device 202 in real time. The operating area recognition module 1012 recognizes the operating area 203 according to the real-time environment data, the non-operating area recognition module 1013 recognizes the non-operating area 1013 according to the real-time environmental data, the boundary generating module 1014 demarcates the boundary 205 between the operating area 203 and the non-operating area 204 in real time. The electronic fence generating module 1022 generates the electronic fence 206 at the boundary 205 in real time.

The decision-making module 103 formulates the safety strategy. The non-operating area analysis module 1031 acquires the position of the non-operating area 204 on the side of the electronic fence 206 from the boundary control module 102. The non-operating area analysis module 1031 analyzes the environment condition of the non-operating area 204, and acquires the environment features of the non-operating area 204. The non-operating area analysis module 1031 further analyzes the safety risks of the non-operating area 204 according to the environment features of the non-operating area 204. The safety strategy formulating module 1032 formulates the safety strategy according to the environmental features of the non-operating area 204. The safety strategy formulating module 1032 further formulates the safety strategy according to the safety risks of the non-operating area 204.

The monitoring module 104 monitors the position of the agricultural machine 201 in real time. The position monitoring module 1041 analyzes the position of the agricultural machine 201 according to the environment data acquired by the monitoring device 202. The position monitoring module 1041 can also locate the position of the agricultural machine 201 through the positioning device of the agricultural machine 201. The trigger determining module 1042 determines whether the agricultural machine 201 triggers the electronic fence 206 according to the position of the agricultural machine 201 monitored by the position monitoring module 1041, if the trigger determining module 1042 determines that the agricultural machine 201 triggers the electronic fence 206, the trigger determining module 1042 feeds back the position of the electronic fence 206 where is triggered by the agricultural machine 201 to the executing module 1033 through the feedback module 1043. The executing module 1033 invokes the safety strategy, and instructs the agricultural machine 201 to execute the safety strategy.

The boundary control module 102 generates the electronic fence 206 in real time, the decision-making module 103 executes the safety strategy corresponding to the electronic fence 206 in real time, so that when the monitoring module 104 determines that the electronic fence 206 is triggered, the decision-making module 103 invokes the safety strategy in time, which is executed by the agricultural machine 201, so as to avoid the safety risks.

Figure 4:
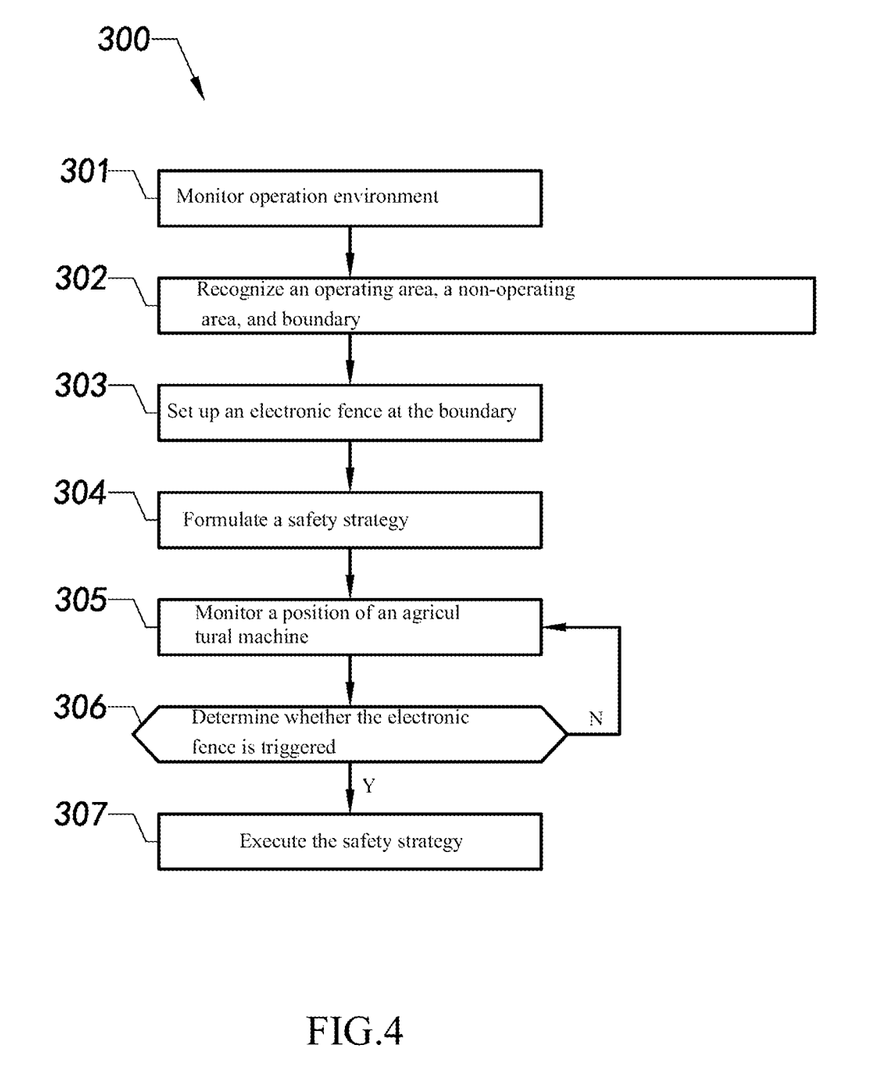
FIG. 4 is a flowchart of the above-mentioned embodiment according to the present disclosure.

Referring to FIG. 4, the present disclosure further provides an operation monitoring method 300, the operation monitoring method 300 includes the following steps:
- 301: monitor operation environment;
- 302: recognize an operating area, a non-operating area, and boundary;
- 303: generate an electronic fence at the boundary;
- 304: formulate a safety strategy;
- 305: monitor a position of an agricultural machine;
- 306: determine whether the electronic fence is triggered;
- 307: execute the safety strategy.

At block 301, the monitoring device 202 monitors the operation environment, and acquires data of the operation environment from the monitoring device 202 through the environment data acquiring module 1011. At block 302, recognize an area in the operation environment for the agricultural machine 201 to operate as the operating area 203 through the operating area recognition module 1012. Recognize an area in the operation environment that does not require the agricultural machine 201 to operate as the non-operating area 204 through the non-operating area recognition module 1013, and generate the boundary 205 between the non-operating area 204 and the operating area 203 through the boundary generating module 1014.

At block 303, generate the electronic fence 206 at the boundary 205 through the boundary control module 102. Therein, one side of the electronic fence 206 is the operating area 203, and the other side of the electronic fence 206 is the non-operating area 204.

At block 304, formulate the safety strategy adapted to the electronic fence 206 by the decision-making module 103. Analyze the environment condition of the non-operating area 204 on the side of the electronic fence 206 through the non-operating area analysis module 1031, so that the safety strategy formulated by the safety strategy formulating module 1032 can adapt to the environment condition of the non-operating area 204.

At block 305, monitor the position of the agricultural machine 201 through the position monitoring module 1041, so as to monitor the real-time position of the agricultural machine 201. At block 306, analyze whether the position of the agricultural machine 201 is located in the electronic fence 206 or goes out of the electronic fence 206 to enter the non-operating area 204, if the agricultural machine 201 is located in the electronic fence 206 or goes out of the electronic fence 206 to enter the non-operating area 204, then determines that the agricultural machine 201 triggers the electronic fence 206 through the trigger determining module 1042.

If it is determined in block 306 that the agricultural machine 201 triggers the electronic fence 206, then perform block 307. At block 307, feed back the position of the electronic fence 206 where is triggered by the agricultural machine 201 to the decision-making module 103 through the feedback module 1043, invoke the safety strategy corresponding to the triggered position of the electronic fence 206 through the executing module 1033, and instruct the agricultural machine 201 to execute the safety strategy through the executing module 1033.

In an example of the present disclosure, the environment analysis module 101 monitors the operation environment through the monitoring device 202, so as to recognize the operating area 203 and the non-operating area 204 in advance, and generate the boundary 205 between the operating area 203 and the non-operating area 204.

The boundary control module 102 generates the electronic fence 206 through the boundary 205 pre-generated by the environment analysis module 101 and demarcates the operating area 203 and the non-operating area 204. The agricultural machine 201 is to operate in the operating area 203. That is, the electronic fence 206 is pre-generated, and prior to the agricultural machine 201 is operating in the operating area 203, the electronic fence 206 is already generated.

Figure 5:
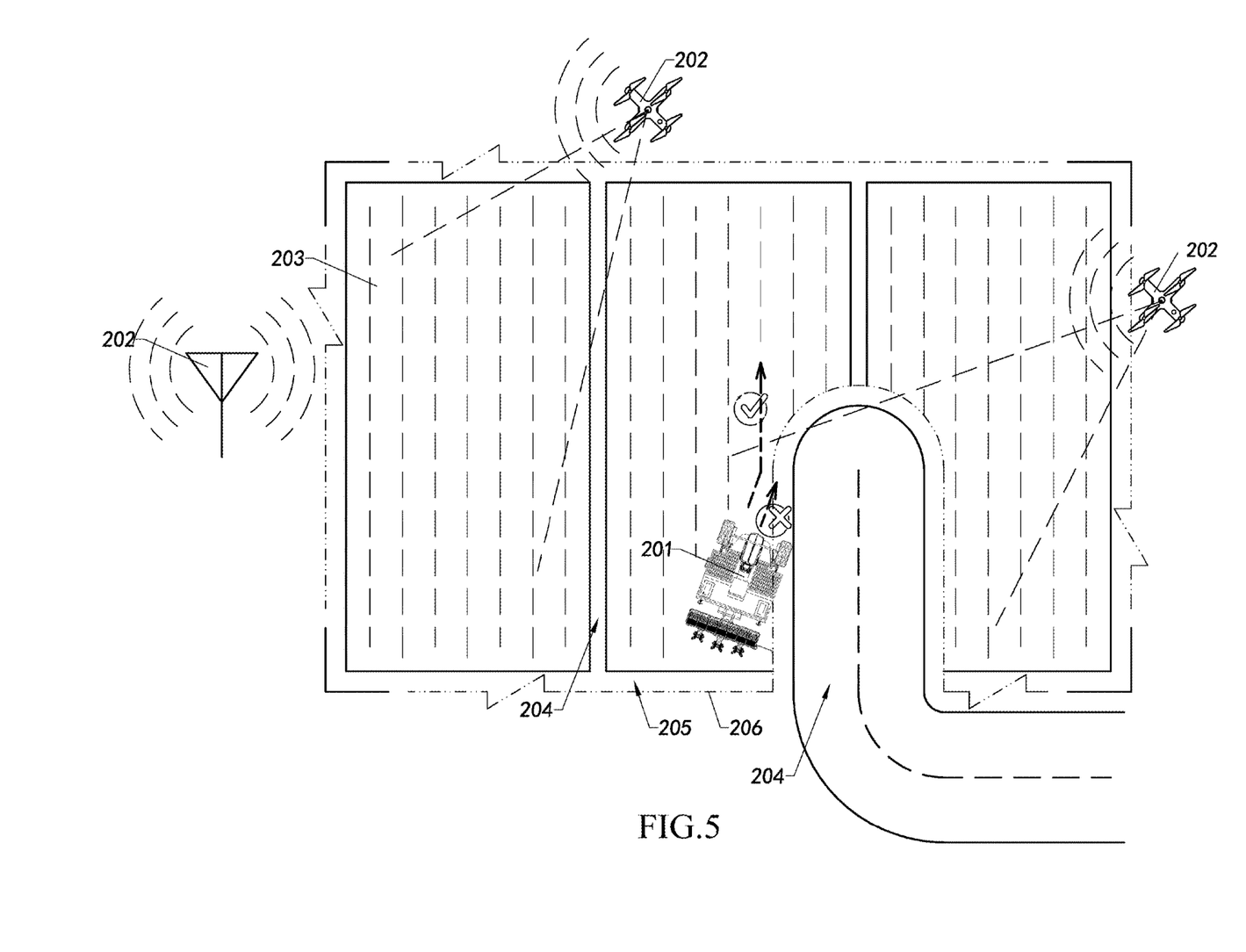
FIG. 5 is a schematic view of the above-mentioned embodiment according to the present disclosure.

Referring to FIG. 5, the monitoring device 202 monitors the operation environment such as vast areas of farmland and its surrounding environment, and acquires data of the farmland and its surrounding environment. The operating area recognition module 1012 recognizes the farmland as the operating area 203, and the non-operating area recognition module 1013 recognizes roads beside the farmland, ridges of the farmland etc., as the non-operating area 204. The boundary generating module 1014 generates the boundary 205 between the farmland and the roads. For example, the ridge between the farmland and the road is the boundary 205, or a boundary line between the farmland and the road is the boundary 205.

The operating area demarcating module 1021 recognizes the operating area 203 where the agricultural machine 201 is to operate, the electronic fence generating module 1022 generates the electronic fence 206 at the boundary 205 between the operating area 203 where the agricultural machine is to operate and the adjacent non-operating area 204.

The decision-making module 103 formulates the safety strategy corresponding to the electronic fence 206. The non-operating area analysis module 1031 analyzes that the non-operating area 203 on the side of the electronic fence 206 is a road, and there is a risk of collision with vehicles or pedestrians. The safety strategy formulating module 1032 executes the safety strategy of leaving the road as soon as possible, the agricultural machine 201 is required to adjust a direction and return to the farmland.

Prior to the agricultural machine 201 operates in the operating area 203, the electronic fence 206 has been generated, and the agricultural machine 201 is to operate in the operating area 203 surrounded by the electronic fence 206. The position monitoring module 1041 monitors the position of the agricultural machine 201. It is worth mentioning that, the position monitoring module 1041 can monitor the position of the agricultural machine through the monitoring device 202 such as an unmanned aerial vehicle, a base station, a satellite etc. The position monitoring module 1041 can also monitor the position of the agricultural machine 201 through the positioning device of the agricultural machine 201.

The trigger determining module 1042 determines whether the electronic fence 206 is triggered by the agricultural machine 201 triggers. The position monitoring module 1041 monitors that the agricultural machine 201 goes beyond the electronic fence 206 and enters the road in the non-operating area 204, the trigger determining module 1042 determines that the agricultural machine 201 triggers the electronic fence 206. The feedback module 1043 feeds back the position of the electronic fence 206 where is triggered by the agricultural machine 201 between the road and the farmland to the decision-making module 103, the decision-making module 103 invokes the safety strategy corresponding to the electronic fence 206 between the road and the farmland, and instructs the agricultural machine 201 to adjusts the direction and return to the farmland.

In another example of the present disclosure, the environment analysis module 101 follows the agricultural machine 201 to monitor the operation environment in real time. The monitoring device 202 is arranged on the agricultural machine 201. The monitoring device 202 arranged on the agricultural machine 201 is implemented as a camera device, a monitoring facility, or a combination of them, to monitor the surrounding environment of the agricultural machine 201 in real time. The monitoring device 202 can also be implemented as an unmanned aerial vehicle, a base station, a satellite, etc., or a combination of them, to monitor the operation environment of the agricultural machine 201 in real time. When the agricultural machine 201 is moving, the monitoring device 202 monitors the operation environment around the agricultural machine 201 in real time.

The environment data acquiring module 1011 acquires the environment data from the monitoring device 202, the operating area recognition module 1012 recognizes the operating area 203 according to the environment data in real time, and the non-operating area recognition module 1013 recognizes the non-operating area 204 according to the environment data in real time. The boundary generating module 1014 generates the boundary in real time according to the recognized operating area 203 and the non-operating area 204 in real time.

The boundary control module 102 generates the electronic fence 206 at the boundary 205, and controls the boundary 205 in real time.

Figure 6:
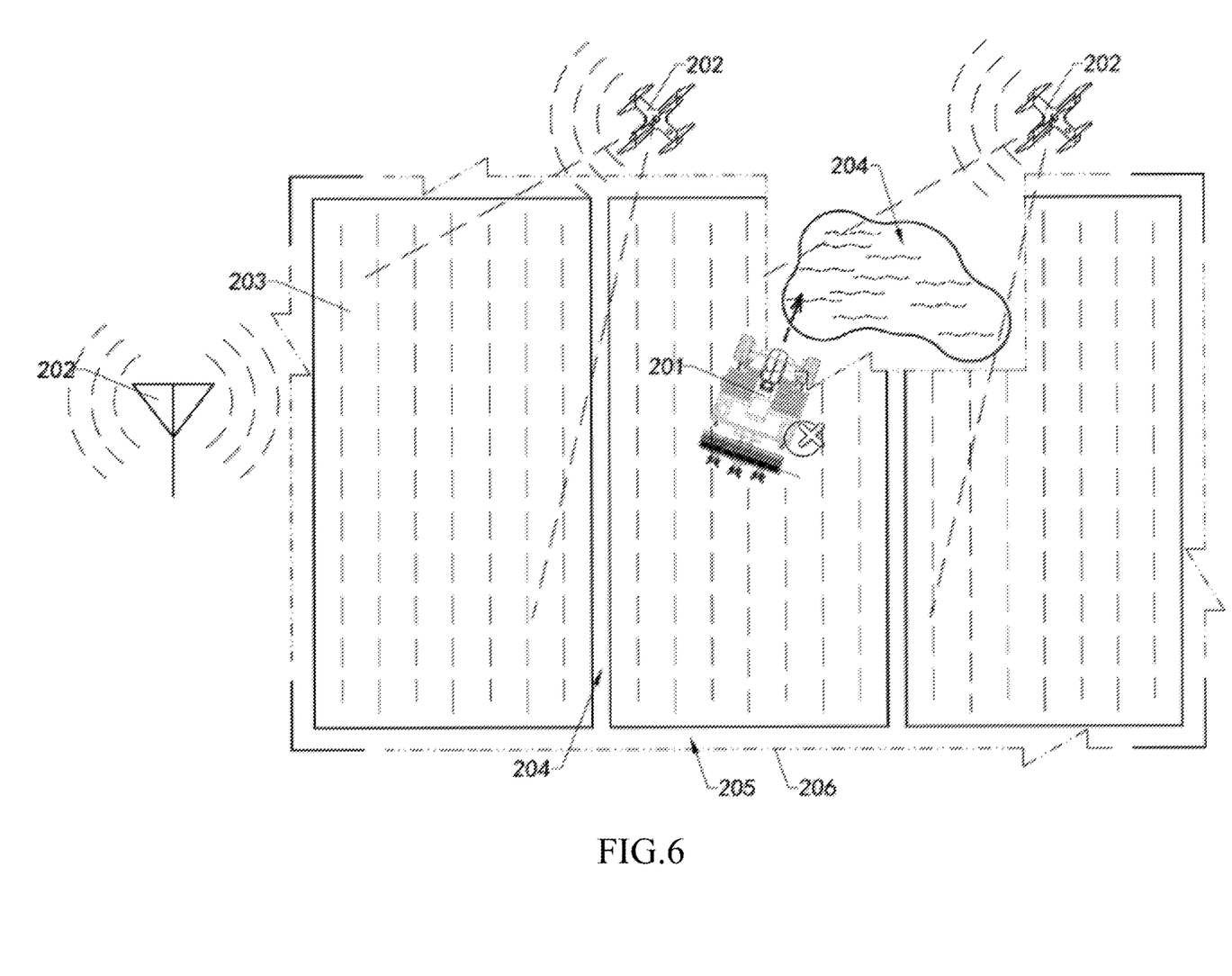
FIG. 6 is another schematic view of the above-mentioned embodiment according to the present disclosure.

When the electronic fence 206 is generated, the decision-making module 103 formulates the safety strategy in real time. Referring to FIG. 6, the agricultural machine 201 is moving in the farmland. The monitoring device 202 carried by the agricultural machine 201 monitors the environment around the agricultural machine 201 and transmits the environment data to the environment data acquiring module 1011. The operating area recognition module 1012 recognizes a current moving position of the agricultural machine 201 as the operating area 203. The non-operating area recognition module 1013 recognizes a front of the agricultural machine 201 as a lake, and determines the lake to be the non-operating area 204.

The boundary generating module 1014 generates the boundary 205 between the farmland and the lake. The boundary control module 102 generates the electronic fence 206 at the boundary 205. The operating area analysis module 1031 analyzes that the agricultural machine 201 goes beyond the electronic fence 206 and may easily fall into the lake. The agricultural machine 201 does not easily adjust the direction in the boundary 205 between the farmland and the lake. The safety strategy formulating module 1032 formulates the safety strategy corresponding to the electronic fence 206 between the farmland and the lake as that the agricultural machine 201 stops moving.

When the position monitoring module 1041 monitors that the current position of the agricultural machine 201 is in the boundary 205 between the farmland and the lake, the trigger determining module 1042 determines that the agricultural machine 201 triggers the electronic fence 206, the feedback module 1043 feeds back the position of the electronic fence 206 where is triggered by the agricultural machine 201 to the decision-making module 103, the executing module 1033 invokes the safety strategy according to the position of the electronic fence 206 where is triggered, and instructs the agricultural machine 201 to stop moving and keep the position according to the safety strategy, so as to prevent the agricultural machine from falling into the lake.

It is worth mentioning that, in another example of the present disclosure, the environment analysis module 101 can pre-acquire the data of the operation environment through the monitoring device 202, or can acquire data of the operation environment in real time through the monitoring device 202. The environment analysis module 101 pre-recognizes the operating area 203 and the non-operating area 204 according to the pre-acquired environmental data, and pre-generates the boundary 205. The boundary control module 102 generates the electronic fence 206 according to the pre-generated boundary 205, so that the electronic fence 206 has been pre-generated prior to the agricultural machine 201 is operating in the operating area 201. At the same time, the environment analysis module 101 acquires the real-time environment data through the monitoring device 202 when the agricultural machine 201 is operating, so as to adjust the operating area 203 and the non-operating area 204 in real time, as well as the corresponding boundary 205, thereby enabling the boundary control module 102 to adjust the electronic fence 206 in real time.

The decision-making module 103 can formulate the safety strategy according to a preset environment condition of the electronic fence 206, when the electronic fence 206 is adjusted in real time, the environment conditions on both sides of the electronic fence 206 change, the decision-making module 103 adjusts the safety strategy in real time, so that when the agricultural machine 201 triggers the electronic fence 206, the executed safety strategy can be adapted to the actual condition.

One skilled in the art should understand that, the above description and the embodiments of the present disclosure shown in the drawings are only examples and do not limit the present disclosure. The purpose of the present disclosure has been completely and effectively achieved. The functions and structural principles of the present disclosure have been shown and explained in the embodiments. Without departing from the principles, the embodiments of the present disclosure may have any deformation or modification.

What is claimed is:

1. An operation monitoring system, configured to monitor at least one agricultural machine, comprising:
   at least one processor; and
   a storage device coupled to the at least one processor and storing instructions for execution by the at least one processor to cause the at least one processor to:
      recognize at least one operating area and at least one non-operating area of an operation environment;
      generate at least one boundary between the at least one operating area and the at least one non-operating area;
      generate at least one electronic fence at the at least one boundary;
      acquire a position of the electronic fence;
      monitor a position of the agricultural machine; and monitor whether the at least one agricultural machine is operating in the operating area on a side of the electronic fence.

2. The operation monitoring system according to claim 1, wherein the at least one processor communicates with at least one monitoring device, the at least one monitoring device monitors the operation environment, generates environment data, and transmits the environment data to the at least one processor.

3. The operation monitoring system according to claim 2, wherein the at least one processor is further caused to:
recognize the operating area of the operation environment;
recognize the non-operating area of the operation environment; and
generate the at least one boundary between the operating area and the non-operating area.

4. The operation monitoring system according to claim 2, wherein the at least one monitoring device pre-monitors the operation environment before operation of the at least one agricultural machine, the at least one processor is further caused to:
pre-acquire the pre-monitored environment data from the monitoring device before the operation of the at least one agricultural machine;
pre-recognize the operating area and the non-operating area before the operation of the at least one agricultural machine; and
generate the at least one boundary before the operation of the at least one agricultural machine.

5. The operation monitoring system according to claim 2, wherein the at least one monitoring device monitors the operation environment in real time, wherein the at least one processor is further caused to:
acquire the environment data from the monitoring device in real time;
recognize the operating area and the non-operating area in real time; and
generate the at least one boundary in real time.

6. The operation monitoring system according to claim 2, wherein the at least one monitoring device is implemented as an unmanned aerial vehicle, a base station, a satellite, or a combination thereof.

7. The operation monitoring system according to claim 2, wherein the monitoring device is implemented as a camera device, a monitoring facility, or a combination thereof.

8. The operation monitoring system according to claim 1, wherein the at least one processor is further caused to:
demarcate the operating area where the agricultural machine is to operate; and
generate the electronic fence at the boundary between the operating area where the agricultural machine is to operate and the non-operating area.

9. The operation monitoring system according to claim 8, wherein the at least one processor is further caused to:
acquire positions of the electronic fence and the non-operating area on the other side of the electronic fence; and
formulate at least one safety strategy according to an environment condition of the electronic fence.

10. The operation monitoring system according to claim 9, wherein the at least one processor is further caused to:
acquire the position of the non-operating area on the other side of the electronic fence; and
analyze environment features of the non-operating area.

11. The operation monitoring system according to claim 10, wherein the at least one processor is further caused to:
acquire the environment features of the non-operating area; and
formulate the safety strategy according to the environment features of the non-operating area on the other side of the electronic fence.

12. The operation monitoring system according to claim 11, wherein the at least one processor is further caused to:
determine whether the agricultural machine triggers the electronic fence according to a position relationship between the agricultural machine and the electronic fence.

13. The operation monitoring system according to claim 12, wherein the at least one processor is further caused to:
feed back the position of the electronic fence triggered by the agricultural machine, when the agricultural machine is determined to have triggered the electronic fence.

14. The operation monitoring system according to claim 13, wherein the at least one processor is further caused to:
invoke the safety strategy corresponding to the position of the electronic fence triggered by the agricultural machine, wherein the safety strategy is executed by the agricultural machine.

15. An operation monitoring method, to monitor an agricultural machine, the operation monitoring method comprising:
generating at least one electronic fence at a boundary between an operating area and a non-operating area;
determining whether the agricultural machine triggers the electronic fence; and
controlling an operating state of the agricultural machine according to a determining result.

16. The operation monitoring method according to claim 15, before the method of generating at least one electronic fence at a boundary between an operating area and a non-operating area, the operation monitoring method further comprising:
determining the boundary between the operating area and the non-operating area.

17. The operation monitoring method according to claim 16, before the method of determining the boundary between the operating area and the non-operating area, the operation monitoring method further comprising:
acquiring environment data by monitoring an operation environment through at least one monitoring device; and
recognizing the operating area and the non-operating area of the operation environment according to the environment data of the operation environment; and
determining the boundary between the operating area and the non-operating area.

18. The operation monitoring method according to claim 15, between the method of generating at least one electronic fence at a boundary between an operating area and a non-operating area and the method of determining whether the agricultural machine triggers the electronic fence, the operation monitoring method further comprising:
analyzing environment features of the non-operating area on a side of the electronic fence; and
formulating a safety strategy according to the environment features of the non-operating area.

19. The operation monitoring method according to claim 15, between the method of generating at least one electronic fence at a boundary between an operating area and a non-operating area and the method of determining whether the agricultural machine triggers the electronic fence, the operation monitoring method further comprising:

acquiring a position of the agricultural machine; and
analyzing a position relationship between the agricultural machine and the electronic fence.

\* \* \* \* \*